United States Patent
Cao

(10) Patent No.: US 6,731,877 B1
(45) Date of Patent: May 4, 2004

(54) HIGH CAPACITY ULTRA-LONG HAUL DISPERSION AND NONLINEARITY MANAGED LIGHTWAVE COMMUNICATION SYSTEMS

(75) Inventor: Xiang-Dong Cao, Boca Raton, FL (US)

(73) Assignee: Qtera Corporation, Boca Raton, FL (US)

( * ) Notice: Subject to any disclaimer, the term of this patent is extended or adjusted under 35 U.S.C. 154(b) by 0 days.

(21) Appl. No.: 09/518,448

(22) Filed: Mar. 3, 2000

(51) Int. Cl.$^7$ .......................... H04J 14/02; H04B 10/04
(52) U.S. Cl. .......................... 398/91; 398/181; 398/192; 398/193; 398/199
(58) Field of Search .................. 359/124, 127, 359/161, 173, 179

(56) References Cited

U.S. PATENT DOCUMENTS

| | | | | |
|---|---|---|---|---|
| 4,558,921 A | | 12/1985 | Hasegawa | 350/96.29 |
| 4,700,339 A | | 10/1987 | Gordon et al. | 370/3 |
| 5,035,481 A | | 7/1991 | Mollenauer | 350/96.16 |
| 5,504,609 A | | 4/1996 | Alexander et al. | |
| 5,710,649 A | | 1/1998 | Mollenauer | 359/123 |
| 6,341,023 B1 | * | 1/2002 | Puc | 359/124 |
| 6,377,375 B1 | * | 4/2002 | Taga et al. | 359/134 |
| 6,433,904 B1 | * | 8/2002 | Swanson et al. | 359/133 |
| 6,452,707 B1 | * | 9/2002 | Puc et al. | 359/161 |
| 6,459,515 B1 | * | 10/2002 | Bergano | 359/124 |
| 6,486,466 B1 | * | 11/2002 | Kidorf | 250/227.23 |
| 2002/0039217 A1 | * | 4/2002 | Saunders et al. | 359/161 |
| 2003/0011839 A1 | * | 1/2003 | Liang et al. | 359/124 |

FOREIGN PATENT DOCUMENTS

EP  0554714 A1  8/1993
EP  0862284 A2  9/1998

OTHER PUBLICATIONS

Book entitled "Optical Fiber Telecommunications IIIA", by I. P. Kaminow et al., pp. 373–461, Academic Press, 1997.
Article entitled "Reduction of Gordon–Haus timing jitter by periodic dispersion compensation in Soliton transmission", by M. Suzuki et al., *Electronic Letters*, vol. 31, No. 23, pp. 2027–2029, 1995.

(List continued on next page.)

*Primary Examiner*—Leslie Pascal
(74) *Attorney, Agent, or Firm*—Hunton & Williams LLP

(57) ABSTRACT

A transmitter terminal in an ultra-long haul optical transmission system receives separate channel input signals in separate ones of a plurality of return-to-zero transmitters (RZTX). Each RZTX generates a corresponding forward error correction (FEC) modulated output signal in a separate channel frequency sub-band including predetermined channel separations from adjacent channel frequency bands. A multiplexing arrangement multiplexes the plurality of channel frequency bands from the RZTXs into separate groups of frequency bands. The groups of frequency bands have predetermined band-gap separations therebetween, and each group of frequency bands has a predetermined separate pre-chirp introduced therein before being multiplexed with all other groups of frequency bands into a single multiplexed output signal. An optical transmission line (OTL) is subdivided into predetermined sections and receives the single multiplexed output signal. A separate Raman amplifier (RA) is located in each separate section of the OTL for providing backward distributed Raman amplification. A dispersion compensating line amplifier (DCLA) is located in predetermined space-apart sections of the OTL for introducing dispersion compensation for the single multiplexed output signal and each of the groups of frequency bands therein.

19 Claims, 10 Drawing Sheets

OTHER PUBLICATIONS

Article entitled "Soliton transmission using periodic dispersion compensation", by N. J. Smith et al., *Journal of Lightwave Technology*, vol. 15, No. 10, pp. 1808–1822, 1997.

Article entitled "1 Tbit/s Transoceanic Transmission Using 30nm–Wide Broadband Optical Repeaters with Aeff–Enlarged Positive Dispersion Slope Fiber and Slope Compensating DCF", by T. Tsuritani et al., Post Deadline papers, *25th European Conference on Optical Communications*, pp. 38–39, 1999.

Article entitled "1 Terabit/s WDM Transmission Over 10,000km", by T. Naito et al., PD2–1, *25th European Conference on Optical Communications*, pp. 24–25, 1999.

Article entitled "1.1–Tb/s (55 × 20–GB/s) Dense WDM Soliton Transmissions Over 3,020–km Widely–Dispersion–Managed Transmission Line Employing 1.55/1.58 um Hybrid Repeaters", by K. Fukuchi et al., PD2–10, pp. 42–43, *25th European Conference on Optical Communications*, 1999.

L. F. Mollenauer et al., "Solitons in high bit–rate, long–distance transmission," Optical Fiber Telecommunications, vol. IIIA. Chapter 12, pp. 373–460, 1997.

Naoya Henmi et al., "Prechirp technique as a linear dispersion compensation for ultra–speed long–span intensity modulation directed detection optical communication systems," 8217 Journal of Lightwave Technology 12(1994), Oct., No. 10, pp. 1706–1719.

European Search Report dated Apr. 29, 2003.

* cited by examiner

HIGH CAPACITY ULTRA-LONG HAUL DISPERSION AND NONLINEARITY MANAGED LIGHTWAVE COMMUNICATION SYSTEMS

FIELD OF THE INVENTION

The present invention relates to method and apparatus for transmitting optical signals in high-capacity, long distance, lightwave communication systems which use Return-To-Zero (RZ) modulation format and dispersion management.

BACKGROUND OF THE INVENTION

Optical nonlinearities of optical transmission fibers have become limiting factors for long distance, high capacity lightwave transmission systems. In an optically amplified transmission system transmission system, the amplified spontaneous emission (ASE) noise degrades the signal-to-noise ratio (SNR), and a higher signal power is then required to maintain a minimum SNR. However, optical nonlinearities distort the transmission signal and thus limits the maximum optical power that can be launched over the optical transmission line.

It is possible to balance the self-phase-modulation (SPM) with chromatic dispersion by a proper design of the transmission pulse waveform as well as the pulse energy. Such nonlinear pulses are known as "optical solitons". Since the chromatic dispersion is compensated for by optical nonlinearity, there is no need to perform dispersion compensation in soliton systems. In this regard see, for example, U.S. Pat. No. 4,558,921 (A. Hasegawa), issued on Dec. 17, 1985, U.S. Pat. No. 4,700,339 (J. P. Gordon), issued on Oct. 13, 1987, and U.S. Pat. No. 5,035,481 (L. F. Mollenauer) issued on Jul. 30, 1991.

Although transoceanic soliton transmission is known, conventional soliton transmission technology has not been commercialized. One of the major problems with conventional soliton transmission is timing jitter. A soliton pulse width is typically approximately 10% of a bit period and there is no fundamental mechanism that can fix such short pulses in time. Perturbations such as soliton—soliton interaction, frequency shift due to the ASE noise, and an acoustic wave generated by a previous pulse tend to move the pulses out of their original position as is indicated in U.S. Pat. No. 5,710,649 (L. F. Mollenauer), issued on Jan. 20, 1998. Still further, many techniques have been used to reduce or eliminate timing jitter as is described in the book entitled "Optical Fiber Telecommunications IIIA" by I. P. Kaminow et al., at pages 373–461 (Academic Press, 1997). All the above techniques, also known as "soliton control technologies" are typically not cost effective in many practical applications, and also complicate system designs.

Recently, a new class of solitons (dispersion managed solitons) were described in the article entitled "Reduction of Gordon-Haus timing jitter by periodic dispersion compensation in Soliton transmission" by M. Suzuki et al., Electronic Letters, Vol. 31, No. 23, pages 2027–2029, 1995. An article entitled "Soliton Transmission Using Periodic Dispersion Compensation", by N. J. Smith et al. in Journal of Lightwave Technology, Vol. 15, No. 10, pages 1808–1822, 1997, discusses a dispersion managed soliton (DMS) which has been shown to have a much better performance than a conventional soliton, while at the same time having inherent desired properties of conventional solitons in dealing with optical nonlinearities. There are five major improvements in DMS transmission systems compared to conventional soliton systems. These five improvements are (a) energy enhancement wherein it is possible to launch much higher signal power for a DMS signal than conventional soliton signals, which improves the system SNR; (b) reduced timing jitter; (c) no additional soliton control technologies are required; (d) it is compatible to existing non-return-to-zero (NRZ); and (e) it has high power and dispersion tolerance.

In an article entitled "1 Tbit/s (100×10.7 Gbits) Trans-oceanic Transmission Using 30 nm-Wide Broadband Optical Repeaters with Aeff-Enlarged Positive Dispersion Slope Fiber and Slope-Compensating DCF" by T. Tsuritani et al., at pages 38–39 of Post-Deadline Papers, 25th European Conference on Optical Communications, 1999, discloses that significant system performance has been achieved using DMS technology in many laboratory experiments in terms of both distance and total capacity. Similar performance has also been demonstrated by many other such as, for example, the articles entitled "1 Terabit/s WDM Transmission over 10,000 km" by T. Naito et al., PD2-1, pages 24–25, 25th European Conference on Optical Communication, 1999, and "1.1-Tb/s (55×20-GB/s) DENSE WDM SOLITON TRANSMISSION OVER 3,020-km WIDELY-DISPERSON-MANAGED TRANSMISSION LINE EMPLOYING 1.55/1.58 um HYBRID REPEATERS", by K. Fukuchi et al., PD2-10, pages 42–43, 25th European Conference on Optical Communication, 1999.

Although previous laboratory experiments have proven the feasibility of DMS systems for long distance and high capacity applications, there are many challenges to achieve both reliability and flexibility such that such DMS system can be used in a realistic environment. For example, in terrestrial optical fiber networks, the distance between repeaters or optical amplifiers can be as long as 130 km. Such distances are significantly longer than those of the previous experiments. The impacts of the longer repeater spacing are two-fold. First, the required signal power is typically much higher to overcome the SNR degradation caused by a required larger amplifier gain. Second, as a result of the required higher signal power, optical nonlinearities become more important for long distance transmission. Another challenge is that there are a variety of different optical fiber types in existing optical fiber networks. Optical nonlinearities become even more detrimental for a transmission line comprising different types of optical fibers. As for DMS systems, the total capacity is limited not only by the optical amplifier bandwidth, but also the higher order chromatic dispersion of the transmission fiber. The situation is even more difficult when there are several different types of optical fibers involved. A reliable and cost-effective solution to higher order chromatic dispersion is one of the major challenges for high capacity long haul DMS systems. Finally, distance and capacity are not the only requirements for next generation optical networks. For example, it is highly desirable to have the flexibility to place optical add/drop nodes anywhere along an optical transmission line.

In a dispersion managed soliton (DMS) system, DMS predicts significant power enhancement which is valid for single channel propagation. The power enhancement cannot be fully utilized for multi-channel system since the cross-phase modulation (XPM) dominates the overall system performance. DMS systems further require an accurate balance between the self-phase modulation (SPM) in the transmission fiber and the SPM a dispersion-compensating fiber which often results in a much smaller system margin.

It is desirable to provide a high capacity ultra-long haul dispersion and nonlinearity managed lightwave communication system which overcomes the problems described hereinabove.

SUMMARY OF THE INVENTION

The present invention is directed to method and apparatus for transmitting optical signals in high-capacity, long distance, lightwave communication systems which use Return-To-Zero (RZ) modulation format and dispersion management.

Viewed from an apparatus aspect, the present invention is directed to an optical transmission system. The optical transmission system comprises a transmitter terminal and an optical transmission line. The transmitter terminal comprises a plurality of return-to-zero (RZ) transmitters and a multiplexing arrangement. Each of the plurality of return-to-zero (RZ) transmitters is adapted to receive a separate channel input signal and to generate therefrom a corresponding forward error correction (FEC) modulated output signal in a separate predetermined channel frequency sub-band of an overall frequency band which includes a predetermined channel separation from an adjacent channel frequency band generated by another RZ transmitter. The multiplexing arrangement multiplexes the plurality of the predetermined channel frequency sub-bands from the plurality of RZ transmitters into separate groups of frequency bands where the groups of frequency bands have a predetermined band-gap separation therebetween wherein each group of frequency bands has a predetermined separate pre-chirp introduced before being multiplexed with all other groups of frequency bands into a single multiplexed output signal. The optical transmission line has an input coupled to an output of the multiplexing arrangement and is subdivided into a plurality of optical transmission line sections. The optical transmission line comprises a plurality of Raman amplifiers and at least one dispersion compensating line amplifier (DCLA). One of the plurality of Raman amplifiers is located at the end of each optical transmission line section and is adapted to receive at an input thereof the single multiplexed output signal propagating in an associated transmission line section and to combine a predetermined Raman pump power signal into the optical transmission line section in an opposite direction to the received single multiplexed output signal to generate at an output thereof an output signal which is Raman amplified for increasing a path averaged optical power without increasing nonlinear degradation. The at least one DCLA is coupled to an output of a Raman amplifier at the end of a predetermined group of optical transmission line sections. The DCLA is adapted to introduce dispersion compensation for the single multiplexed output signal, and to introduce separate high-order dispersion compensation for each of the groups of frequency bands therein.

Viewed from a method aspect, the present invention is directed to a method of transmitting signals in an optical transmission system. The method comprises the steps of: (a) receiving each channel input signal of a plurality of channel input signals in a separate one of a plurality of return-to-zero (RZ) transmitters, and generating therefrom a corresponding forward error correction (FEC) modulated output signal in a separate predetermined channel frequency sub-band of an overall frequency band which includes a predetermined channel separation from an adjacent channel frequency band generated by another RZ transmitter; (b) multiplexing the plurality of the predetermined channel frequency bands from the plurality of RZ transmitters into separate groups of frequency bands where the groups of frequency bands have a predetermined band-gap separation therebetween, wherein each group of frequency bands has a predetermined separate pre-chirp introduced before being multiplexed with all other groups of frequency bands into a single multiplexed output signal; (c) receiving the single multiplexed output signal in an optical transmission line which is subdivided into predetermined optical transmission line sections; (d) receiving the single multiplexed output signal propagating in each optical transmission line section by a separate Raman amplifier which combines a predetermined Raman pump power signal into the optical transmission line section in an opposite direction to the received single multiplexed output signal to generate an output signal which is Raman amplified for increasing a path averaged optical power without increasing nonlinear degradation; and (e) introducing dispersion compensation from a dispersion compensating line amplifier (DCLA) into the single multiplexed output signal from an output of a Raman amplifier at the end of a predetermined group of optical transmission line sections for providing separate high-order dispersion compensation for each of the groups of frequency bands in said single multiplexed output signal.

The invention will be better understood from the following more detailed description taken with the accompanying drawings and claims.

DETAILED DESCRIPTION

Figure 1A:
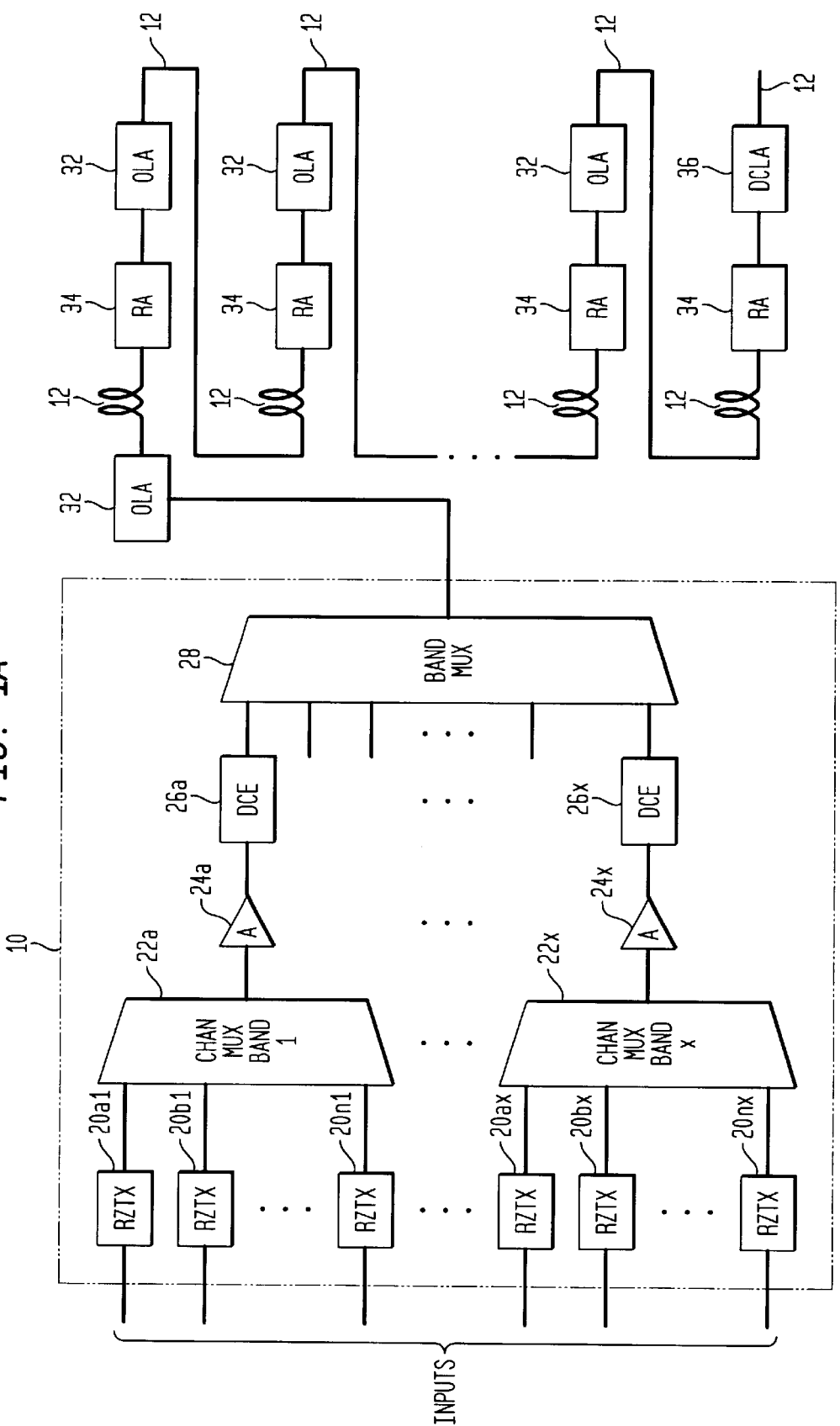
FIGS. 1A and 1B show a block diagram of an exemplary ultra-long haul lightwave transmission system in accordance with the present invention.

The present invention uses three enabling technologies to overcome the practical challenges found in the prior art. These three enabling technologies are: (a) a return-to-zero (RZ) modulation format, (b) a wavelength band structure for each of bandwidth, dispersion, and nonlinearity management, and (c) distributed Raman amplification. None of the three enabling technologies by itself can be used to realize a required system performance for a high capacity, long distance lightwave transmission system. The description which follows describes the problems that must be solved and how the above-mentioned three technologies are optimally used to achieve the required system performance.

Since optical nonlinearities and amplifier noise are the two major limitations for ultra-long haul optical transmission, the utilization focus of the above-mentioned three different technologies is to minimize the impact of optical nonlinearities while maximizing the optical signal-to-noise ratio (OSNR). There are four major optical nonlinearities in single mode transmission fibers. They are (a) self-phase modulation (SPM) which refers to a single channel nonlinear effect resulting from an optical Kerr effect, (b) cross-phase modulation (XPM) which is a multi-channel nonlinear effect resulting from the optical Kerr effect, (c) four-wave mixing (FWM) which is a coherent multi-channel nonlinear effect resulting from the optical Kerr effect, and (d) stimulated Raman scattering (SRS) which is a multi-channel nonlinear effect resulting from an interaction between laser radiation and molecular vibrations.

It is found that a return-to-zero (RZ) modulation format is very effective in minimizing SPM [described in nonlinearity (a) above] if a dispersion map is optimized. There exists a certain range of optimum pulse width which allows the design of a an RZ transmission system using available commercial transmitter components. The optimum pulse width is also affected by choices of frequencies for channel spacings.

With regard to cross-phase modulation (XPM) described for nonlinearity (b) above, XPM is the most difficult optical nonlinearity to manage. In accordance with the present invention, three techniques are used to minimize XPM. First, the transmission bandwidth is divided into frequency bands with predetermined band gaps between adjacent bands to aid in limiting the XPM degradation to a tolerable level. A channel loading penalty due to XPM decays much faster than with uniform channel allocation or non-band techniques. Second, the use of backward distributed Raman amplification helps to increase the path averaged optical powers without increasing nonlinear degradation. This makes it possible to maintain a required OSNR while reducing the channel launching power. Third, as is described hereinbelow, the technique for higher dispersion management helps to randomize a phase relationship among different frequency bands. This reduces the worst case scenario of channel realignment due to periodic dispersion compensation.

Four-wave mixing (FWM), described for nonlinearity (c) above, is minimized by channel frequency allocation as well as distributed Raman amplification for the reasons expressed hereinbefore for the advantages of channel frequency allocation and distributed Raman amplification. The impact of stimulated Raman scattering (SRS), described for nonlinearity (d) above, is two-fold. SRS causes energy transfer among channels which generates a dynamic power tilt, and it gives rise to statistical channel-to-channel cross-talk. In accordance with the present invention, the dynamic power tilt problem is solved by using automatic band power equalization inherent in the structure of higher order dispersion management. Channel-to-channel Raman cross-talk is substantially reduced by distributed amplification due to the use of a lower launching power.

The ultimate transmission distance is determined by optical nonlinearities and optical amplifier noise. It is possible to control the growth of amplifier noise by placing optical amplifiers at closer spacings, just as in submarine optical transmission systems. However, system designers do not have this freedom in designing terrestrial transmission systems. Even though the impacts of optical nonlinearities have been minimized, forward error correction (FEC) is required to extend the transmission distance beyond the nonlinearity limits. The effectiveness of FEC is affected by the extent of nonlinearity management. On the other hand, an out-of-band FEC technique requires higher bit rate or shorter pulses, which also affect the nonlinearity management.

Figure 1B:
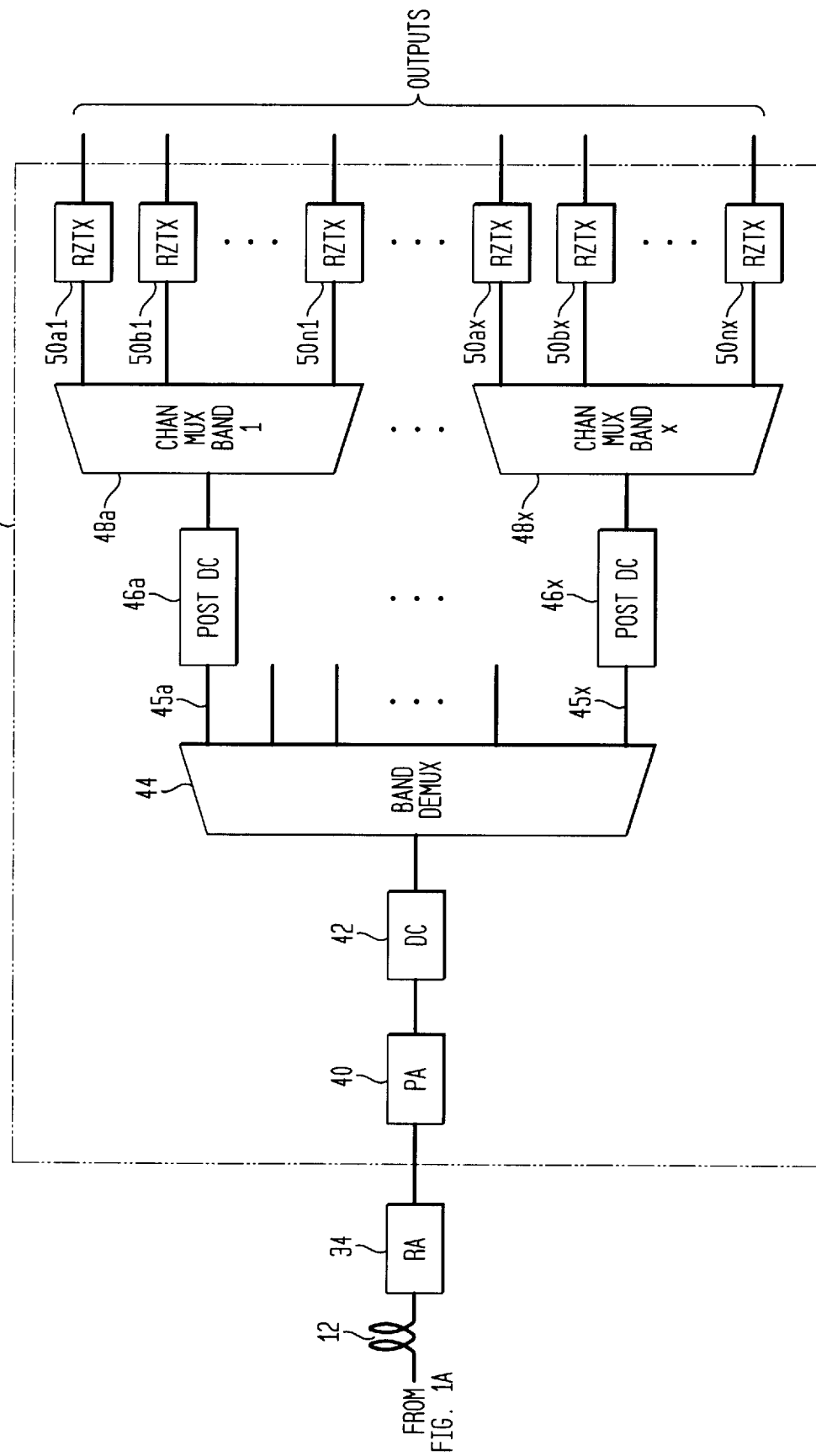

Referring now to FIGS. 1A and 1B, there is shown a block diagram of an exemplary ultra-long haul lightwave transmission system in accordance with the present invention. FIG. 1A shows a block diagram of an exemplary transmitting terminal 10 (shown within a dashed-line rectangle) and an exemplary ultra-long haul optical transmission line 12 in accordance with the present invention. FIG. 1B shows a block diagram of a remaining portion of the exemplary ultra-long haul optical transmission line 12 shown in FIG. 1A, and an exemplary receiving terminal 14 (shown within a dashed-line rectangle) for receiving the optical signals from the transmitting terminal 10 in accordance with the present invention.

The exemplary transmitting terminal 10 comprises a plurality of X groups of N return-to-zero transmitters (RZTX) 20a–20n each (of which only the group of RZTXs 20a1–20n1 for group 1 and the group of RZTXs 20ax–20nx are shown), a plurality of X channel multiplexers (CHAN MUX BAND) 22a–22x (of which only channel multiplexers 22a and 22x are shown), a plurality of X low power optical amplifiers (A) 24a–24x (of which only amplifiers 24a and 24x are shown), a plurality of X dispersion compensating elements (DCE) 26a–26x (of which only DCEs 26a and 26x are shown), and a band multiplexer (BAND MUX) 28. Each of the RZTXs 20a1–20n1 receives a separate input signal and converts the associated input signal into a separate output signal in a separate frequency band of an overall first frequency band (BAND 1). Similarly, each of the RZTXs 20ax–20nx receives a separate input signal and converts the associated input signal into a separate output signal in a separate frequency band of an overall last frequency band (BAND X). It is to be understood, that although each group of RZTXs is shown as comprising n RZTXs 20a–20n, the number "n" in each group can comprise a different number where in a practical arrangement an equal number of RZTXs 20a–20n are not available for each of the X groups of RZTXs 20a–20n. The channel multiplexers 22a and 22x receive the outputs from the RZTXs 20a1–20n1 and 20ax–20nx, respectively, and multiplex the received signals within the proper frequency band slots of the respective overall frequency bands 1 and X and transmits a separate single output signal. The combined signals in the first overall frequency band (BAND 1) from the first channel multiplexer (CHAN MUX BAND 1) 22a are transmitted through a low power optical amplifier 24a, which amplifies the first overall frequency band signal to a predetermined level, and then a dispersion compensating element 26a that adds a predetermined chirp (dispersion value) to the associated first overall frequency band. Similarly, the combined signals in the last overall frequency band (BAND X) from the last channel multiplexer (CHAN MUX BAND X) 22a are transmitted through a low power optical amplifier 24x, which amplifies the last overall frequency band signal to a predetermined level, and then to a dispersion compensating element 26x that adds a predetermined chirp (dispersion value) to the associated last overall frequency band. The output signals from each of the dispersion compensating elements 26a–26x are received at separate inputs of the band multiplexer 28 where the plurality of X overall frequency bands are combined into a single output signal from the transmitting terminal 10 for transmission over an ultra-long haul optical transmission line 12.

In the transmitting terminal 10, the overall transmission frequency bandwidth is divided into many smaller frequency bands 1–X with predetermined gaps therebetween between the adjacent frequency bands. Each frequency band 1–X contains a predetermined number "n" of channels obtained from the associated RZTXs 20a–20n with predetermined channel spacings.

The ultra-long haul optical transmission line 12 comprises a plurality of optical line amplifiers (OLA) 32, a plurality of backward-pumped Raman amplifiers (RA) 34, and at least one dispersion compensating line amplifier (DCLA) 36. Each section of the optical transmission line comprises one of the optical line amplifier (OLA) 32 at the beginning which can comprise an Erbium-doped fiber amplifier (EDFA), and one of the backward-pumped Raman amplifiers (RA) 34 at the end of the optical transmission line section. After a predetermined number of optical transmission line sections, the OLA 32 is replaced by one of the dispersion compensating line amplifier (DCLA) 36. The functionalities of the DCLA 36 are mainly two-fold. The DCLA 36 compensates for higher-order chromatic dispersion, and equalizes the band power. The DCLA 36 also provides the benefits of reducing the cross-phase modulation (XPM) among adjacent bands. The location of the DCLA 36 along the optical transmission line 12 can be flexible, which allows network designers to place DCLAs 36 at convenient locations. After the DCLA 36, the structure of the optical transmission line 12 periodically repeats itself until reaching the final destination at the receiving terminal 14 shown in FIG. 1B.

As shown in FIG. 1B, in the last optical transmission line section, the optical signals pass through the final backward-pumped Raman amplifier (RA) 34, and are received by the receiving terminal 14. The receiving terminal 14 comprises a pre-amplifier (PA) 40, a broadband dispersion compensator (DC) 42, a band demultiplexer (BAND DEMUX) 44, a plurality of post dispersion compensating (POST DC) modules 46a–46x (of which only Post DCs 46a and 46x are shown), a plurality of channel band demultiplexers (CHAN BAND DEMUX) 48a–48x (of which only CHAN BAND DEMUXs 48a and 48x are shown), and a plurality of (N)(X) return-to-zero receivers (RZRX) 50a–50n (of which only RZRX receivers 50a1–50an and 50n1–50nx are shown for bands 1 and X, respectively).

The band demultiplexer 44 functions to separate each of the overall frequency bands 1–X received from the optical transmission line 12 into individual outputs for propagation over optical fiber paths 45a–45x, respectively, of which only optical fiber paths 45a and 45x are shown with included devices. A post dispersion compensating module 46a receives the signals in frequency band 1 via optical fiber path 45a and provides post dispersion compensation for frequency band 1. Similarly, a post dispersion compensating module 46x receives the signals in frequency band X via optical fiber path 45x and provides post dispersion compensation for frequency band X. Each of the plurality of channel band demultiplexers 48a–48x receives the output signals from a separate associated one of the plurality of post dispersion compensating modules 46a–46x, and further demultiplexes the received frequency band (e.g., frequency band 1) into the associated individual channels for transmission over a separate output path. Each of the channels 1–n of frequency band 1 from channel band demultiplexer 48a is coupled to an corresponding separate one of the plurality of RZRXs 50a1–50n1, and each of the channels 1–n of frequency band X from channel band demultiplexer 48x is coupled to an corresponding separate one of the plurality of RZRXs 50ax–50nx.

Figure 2:
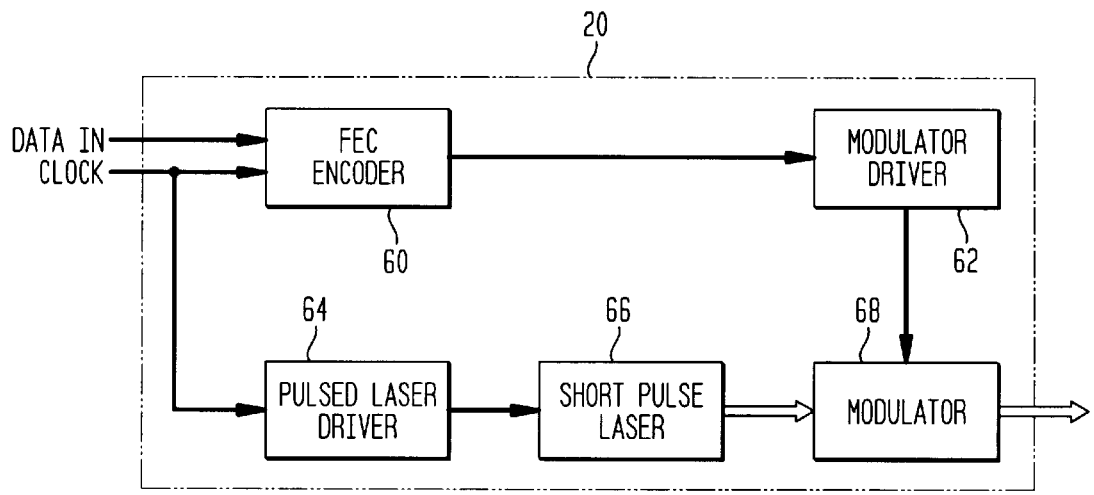
FIG. 2 shows a block diagram of an exemplary return-to-zero transmitter for use in a transmitting terminal of the exemplary ultra-long haul lightwave transmission system of FIGS. 1A and 1B in accordance with the present invention.

Referring now to FIG. 2, there is shown a block diagram of an exemplary return-to-zero transmitter (RZTX) 20 (shown within a dashed line rectangle) for use in the transmitting terminal 10 of the exemplary ultra-long haul lightwave transmission system of FIGS. 1A and 1B in accordance with the present invention. The RZTX 20 comprises an Forward Error Correction (FEC) encoder 60, a modulation driver 62, a pulsed laser driver 64, a short pulse laser source 66, and an optical modulator (MODULATOR) 68. Input electronic data and clock signals are received at separate inputs of the FEC encoder 60 which provides an encoded data output signal for transmission to the modulator driver 62. The modulation driver 62 uses the FEC encoder 60 output signal to drive the optical modulator 68. The electronic clock signal is also received at an input of the pulsed laser driver 64 which is used to drive the short pulse laser source 66 to provide a corresponding optical laser output signal. The short pulse laser source 66 can be implemented by any suitable laser source as, for example, a Lithium-Niobate modulator, and electro-absorption modulator, or directly by a mode-locked short pulse laser. The optical modulator 68 modulates the optical output signal from the short pulse laser source 66 with the FEC encoded output signal from the modulation driver 62 to generate an return-to-zero (RZ) optical data output signal from the RZTX 20.

Figure 3:
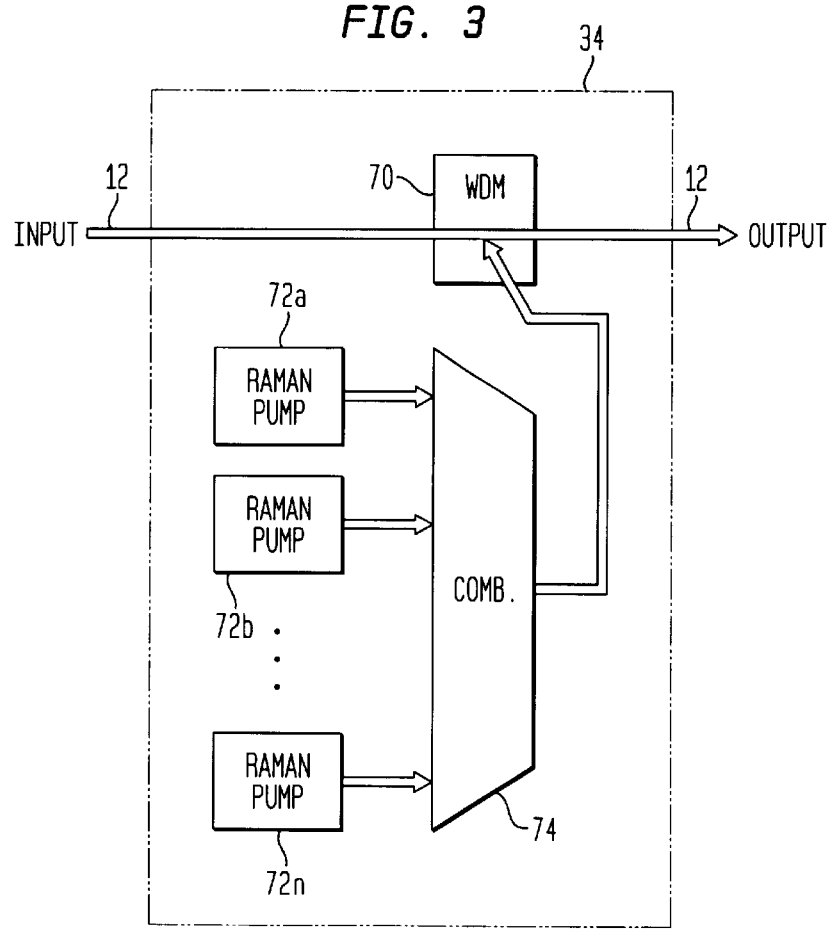
FIG. 3 shows a block diagram of a Raman amplifier for use in a optical transmitting fiber of the exemplary ultra-long haul lightwave transmission system of FIGS. 1A and 1B in accordance with the present invention.

Referring now to FIG. 3, there is shown a block diagram of a Raman amplifier (RA) 34 (shown within a dashed line rectangle) for use in a optical transmitting fiber 12 of the exemplary ultra-long haul lightwave transmission system of FIGS. 1A and 1B in accordance with the present invention. The Raman amplifier 34 comprises a wavelength division multiplexer (WDM) 70, a plurality of n Raman pump lasers (RAMAN PUMP) 72a–72n (of which only Raman pump lasers 721, 72b, and 72n in FIG. 3 are shown), and a pump laser combiner (COMB.) 74. The number of Raman pump lasers 72a–72n, as well as the pump wavelengths therefrom, is determined by the types of fibers of the optical transmission fiber 12 and the required amplifications. The combined output from the pump laser combiner 74 is coupled into the optical transmission line 12 in the opposite direction to the received input signals by the WDM 70.

Figure 4:
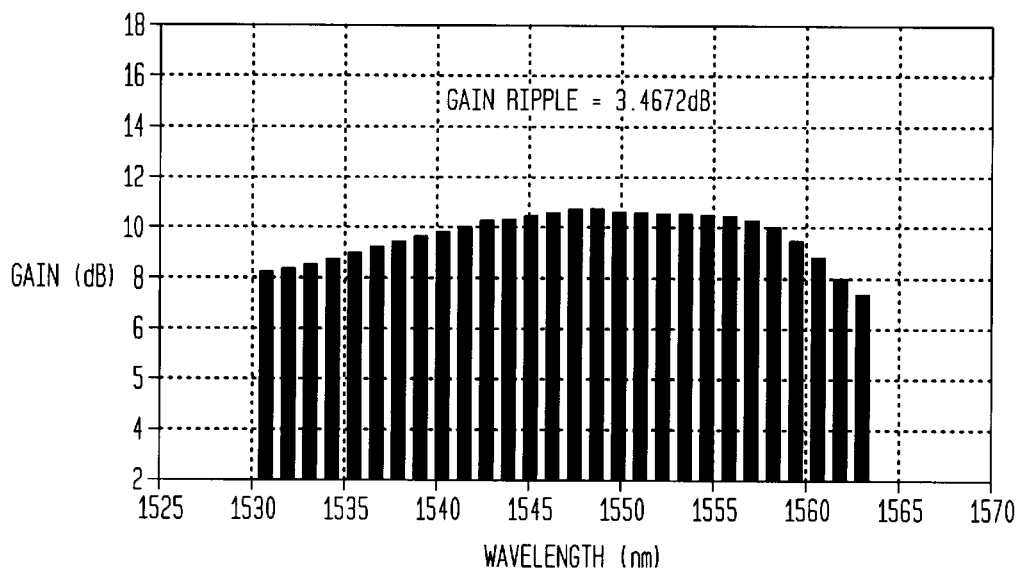
FIG. 4 graphically shows an exemplary Raman Gain characteristic shape obtainable from the Raman amplifier of FIG. 3 in accordance with the present invention.

Referring now to FIG. 4, there is shown a graph of Gain in dB (decibels) on the Y-axis versus Wavelength in nanometers (nm) on the X-axis of an exemplary Raman Gain characteristic shape for various channels obtainable from the Raman amplifier of FIG. 3 in accordance with the present invention. The exemplary Raman Gain characteristic shape of FIG. 4 is obtained using a transmission fiber 12 which is a non-zero dispersion-shifted fiber (NZDSF) with a length of 100 km, a signal loss of 0.22 dB/km, a pump loss of 0.3 dB/km, and two pump lasers 72 with a total pump power of 247.4 mW. The backward distributed Raman amplifications have the benefits of optical signal-to-noise ratio (OSNR) enhancement and negligible nonlinear degradations. Due to the attenuation of the optical fiber 12, the signal power near the end of the transmission fiber 12 is orders of magnitude lower than that at the input. Some moderate amplification near the end of the transmission fiber 12 will not increase the signal power to the nonlinear regime. On the other hand, the path averaged signal power is greatly enhanced so that the overall noise build-up of the transmission line 12 is suppressed. The selection of the Raman gain is determined by both nonlinear degradation and extra noise addition due to the Raman amplification. After Raman amplification, the output signals from the Raman amplifier 34 of FIG. 3 are coupled into the line amplifiers 34 of a next section of the transmission line 12.

Figure 5:
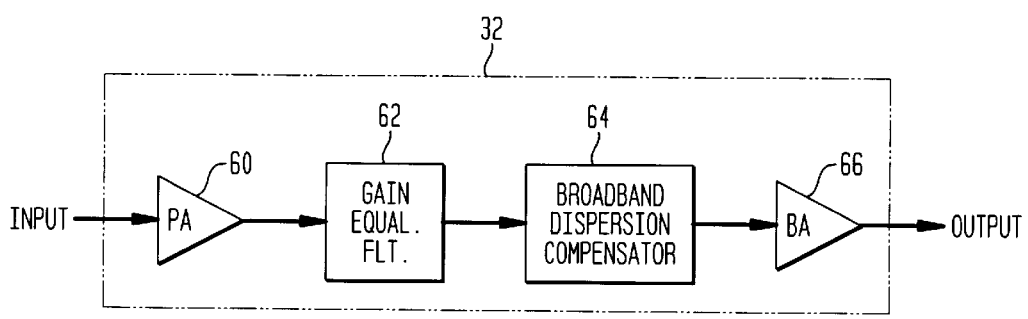
FIG. 5 shows a block diagram of an optical line amplifier for use in a optical transmitting fiber of the exemplary ultra-long haul lightwave transmission system of FIGS. 1A and 1B in accordance with the present invention.

Referring now to FIG. 5, there is shown a block diagram of an exemplary optical line amplifier (OLA) 32 (shown within a dashed line rectangle) for use in a optical transmitting fiber 12 of the exemplary ultra-long haul lightwave transmission system of FIGS. 1A and 1B in accordance with the present invention. The exemplary optical line amplifier 32 comprises a serial arrangement of a low noise preamplifier (PA) 80, such as an Erbium-doped fiber amplifier (EDFA), a gain equalization filter (GAIN EQUAL. FLT.) 82, an optional broadband dispersion compensator 84 (shown within a dashed line rectangle), and a boost amplifier (BA) 86. The gain equalization filter 82 functions to equalize gain variations resulting from a Raman amplifier 34 at the end of a prior section of the transmission line 12, the transmission fiber 12 itself, the pre-amplifier 90, and the boost amplifier 85 (shown in FIG. 5) in the prior optical line amplifier 32. The broadband dispersion compensator 84 is optional depending on the types of the transmission fibers used in the transmission lines 12. The broadband dispersion compensator 84 is required for standard non-dispersion shifted fibers that have high chromatic dispersion at the transmission wavelength, while it is not required for the non-zero dispersion-shifted fibers (NZDSF).

Figure 6:
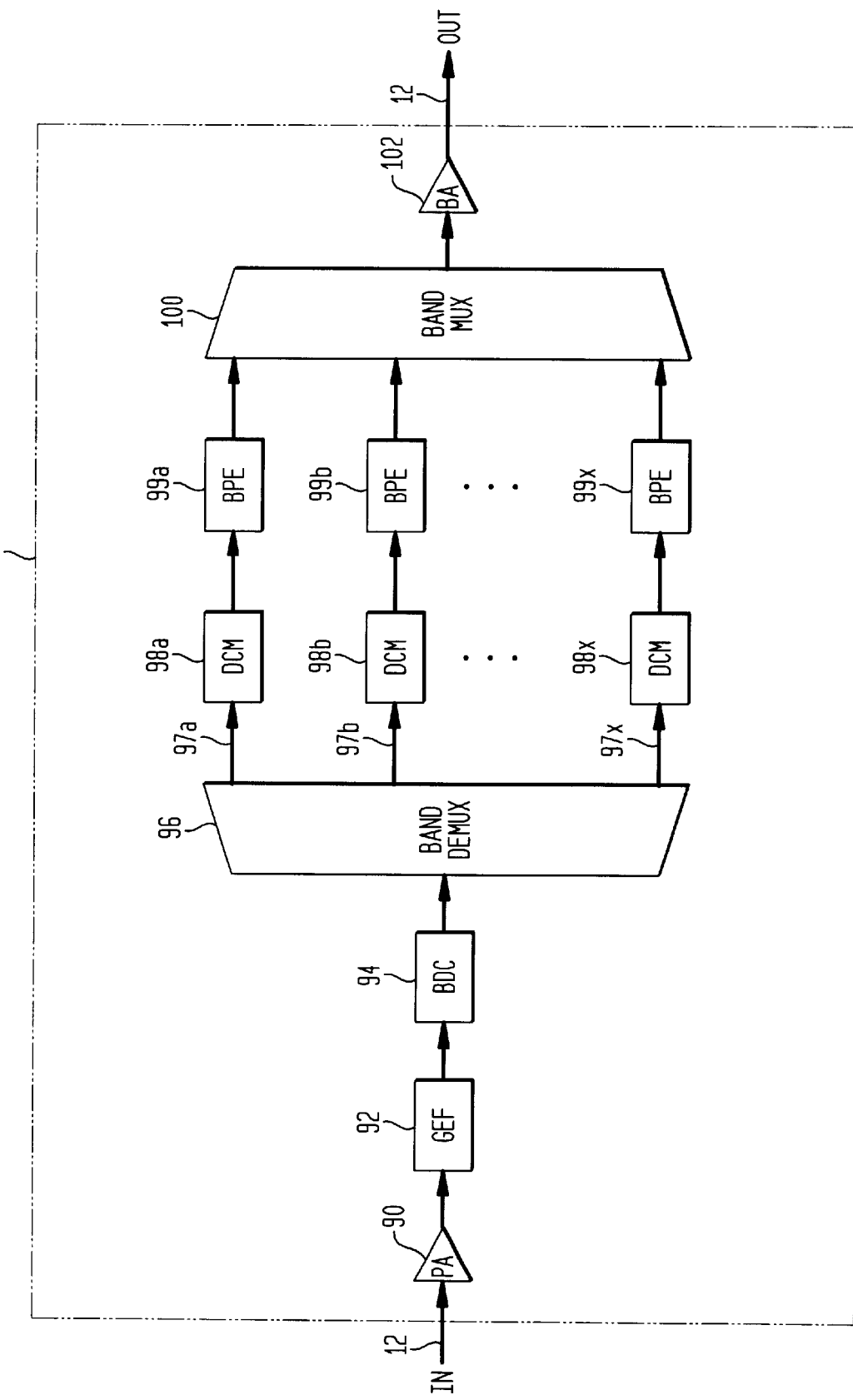
FIG. 6 shows a block diagram of a dispersion compensating line amplifier for use in a optical transmitting fiber of the exemplary ultra-long haul lightwave transmission system of FIGS. 1A and 1B in accordance with the present invention.

Referring now to FIG. 6, there is shown a block diagram of an exemplary dispersion compensating line amplifier (DCLA) 36 (shown within a dashed line rectangle) for use in a optical transmitting fiber 12 of the exemplary ultra-long haul lightwave transmission system of FIGS. 1A and 1B in accordance with the present invention. The dispersion compensating line amplifier (DCLA) 36 comprises a preamplifier (PA) 90, a gain equalization filter (GEF) 92, a broadband dispersion compensator (BDC) 94, a band demultiplexer 96, a plurality of X dispersion compensating modules (DCM) 98a–98x (of which only DCMs 98a, 98b, and 98x are shown), a plurality of X band power equalizers (BPE) (of which only BPEs 99a, 99b, and 99x are shown), a band multiplexer (BAND MUX) 100, and a boost amplifier (BA) 102. The dispersion compensating line amplifier 36 replaces an optical line amplifier 32 after a predetermined sections of the optical transmission line 12. The arrangement of the pre-amplifier (PA) 90, gain equalization filter (GEF) 92, and broadband dispersion compensator (BDC) 94 is similar to that found for the PA 80, GEF 82, and BDC 84 of the optical line amplifier (OLA) 32 of FIG. 5, but differs in that a higher order of dispersion compensation is provided by the BDC 94. The output power of the pre-amplifier 90 is designed to be small so that nonlinearities of the BDC 94 are insignificant. Another difference between the DCLA 36 and the OLA 32 is that the BDC 94 is required regardless of the fiber types found in the optical transmission line 12.

The output of the BDC 94 is received in the band demultiplexer 96 which divides the overall received frequency band into the X frequency bands therein and outputs the 1–X frequency bands over separate optical paths 97a–97x (of which only paths 97a, 97b, and 97x of FIG. 6 are shown). Optical path 97a receives the frequency band 1 and includes a serial arrangement of the dispersion compensating module (DCM) 98a and the band power equalizer (BPE) 99a. The DCM 98a includes a predetermined dispersion value which is specific to the frequency band 1. The combination of the BDC 94 and the DCM 99a makes it possible to design the accumulated dispersion value for frequency band 1 to a predetermined value. Each of the DCMs 98b–98x and the associated BPEs 99b–99x function in a similar manner for the associated frequency bands 2–X, respectively. Due to the higher-order dispersion, or dispersion slope of the transmission fiber 12 and the BDC 94, the accumulated dispersion of each of the frequency bands 1–X will differ. Using a separate DCM 98a–98x for each of frequency bands 1–X negates this difference and provides a flexible mechanism for dispersion management for any type of optical fiber that is used for optical transmission fiber 12. The output of each of the DCMs 98a–98x is coupled to a separate associated on of the BPEs 99a–99x which can be, for example, an adaptive variable attenuator. The output from each of the BPEs 99a–99x is coupled to a separate input of the band multiplexer 100 where the 1–X frequency band signals are combined into a single output signal which is amplified by the boost amplifier 102 to a predetermined value. The implementation of the DCLA 36 can vary depending on other considerations such as cost, size, and loss. For example, the band multiplexer 100 and the band demultiplexer 96 can by formed from dielectric thin film filters, or an interleaver and filter combination.

Figure 7:
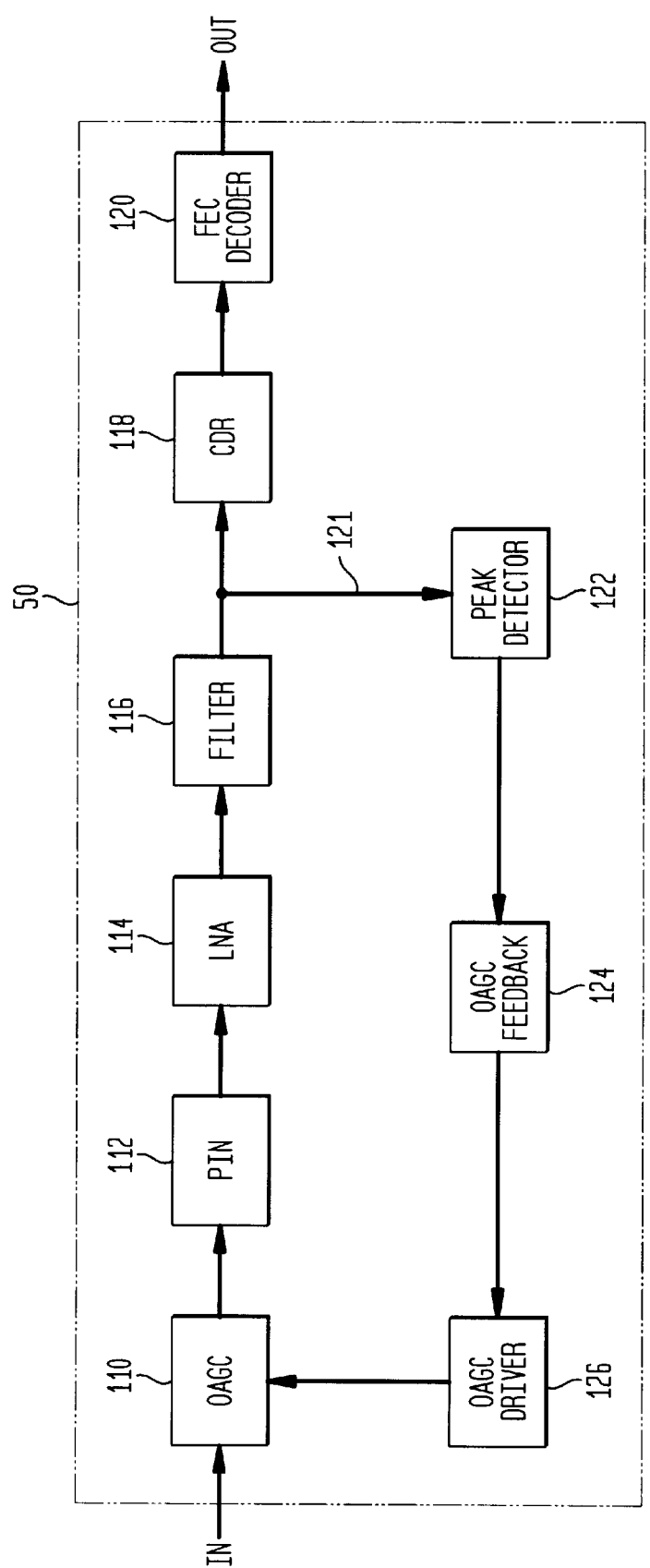
FIG. 7 shows a block diagram of an exemplary return-to-zero receiver for use in a receiving terminal of the exemplary ultra-long haul lightwave transmission system of FIGS. 1A and 1B in accordance with the present invention.

Referring now to FIG. 7, there is shown a block diagram of an exemplary return-to-zero receiver (RZRX) 50 (shown within a dashed line rectangle) for use in a receiving terminal 14 of the exemplary ultra-long haul lightwave transmission system of FIGS. 1A and 1B in accordance with the present invention. The RZRX 50 comprises an optical automatic gain control (OAGC) unit 110, a standard linear channel comprising a high-speed PIN diode (PIN) 112, a low noise amplifier (LNA) 114, and a low-pass filter (FILTER) 116. The RZRX 50 further comprises a clock/data recovers (CDR) unit 118, a forward error correction (FEC) decoder 120, a peak power detector (PEAK DETECTOR) 122, a OAGC feedback mechanism (OAGC FEEDBACK) 124, and an OAGC driver 126. An associated incoming optical channel signal is received in the OAGC unit 110 and amplified in an EDFA therein, and then coupled into the high-speed PIN diode 112 to complete a conversion of the received optical signal into a corresponding electrical signal output signal. The LNA 114 amplifies the electrical output signal from the PIN diode 112 and passes it through the low-pass filter 116. The filtered output signal is transmitted to the CDR 118 and the peak power detector 122.

The CDR 118 recovers the clock and data signal from the received channel signal and provides them as an input to the FEC decoder 120. The FEC decoder corrects for any transmission errors in the data signal using the FEC information, and provides the corrected data signal as an output from the RZRX 50. The output of the peak power detector 122 has a predetermined bandwidth and is used as a feedback signal to the OAGC feedback unit 124 and, in turn, the OAGC driver

126. The OAGC driver 126 provides a feedback signal to the OAGC unit 110 which is used to control the EDFA pump current so that the peak power at the CDR 118 is a fixed value.

There are four important system parameters that have the biggest impact on system performance. These are (a) pulse width, (b) values of pre-chirp, (c) path averaged dispersion, and (d) channel power. Since the bit error rate (BER) or Q factor are the ultimate indicator for system performance, Q or BER is used to optimize the system performance. Since Q is a highly nonlinear function of not only the four parameter mentioned hereinabove, but also many other system parameters, a large number of system simulations are required so that a global optimization is achieved. An example of multidimensional Q mapping are summarized as follows.

In an design for a exemplary system to describe the present invention, it is assumed that there are a total of 56 channels grouped into 14 bands with each band comprising four channels with a channel separation of 50 GHz. Although an information bit rate is 10 Gbit/s, the actual bit rate is increased to 12.12 Gbit/s due to extra bandwidth required from the FEC encoder 60 shown in FIG. 2. The bandgap is 150 GHz. The transmission fiber 12 is the standard non-dispersion shifted fiber (NDSF) with a span length of 100 km. The Raman gain after gain equalization is 8 dB.

Figure 8:
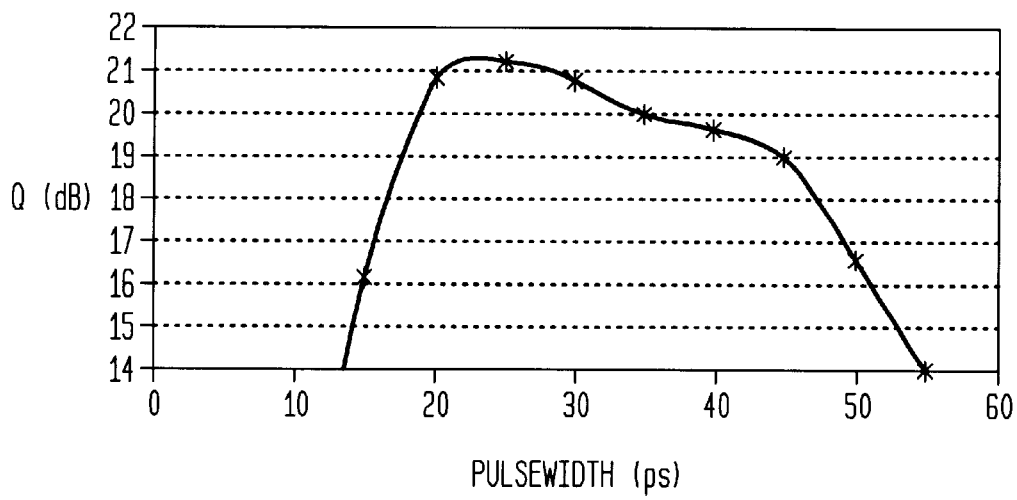
FIG. 8 graphically shows a plot for system performance at different pulse widths for an exemplary system in accordance with the present invention.

Referring now to FIG. 8, there is graphically shown a plot for an optimization of pulse width for improved system performance with different pulse widths in picoseconds (ps) shown along the horizontal axis versus Q in decibels (dB) along the vertical axis for the exemplary system. When the pulse width is shorter than 20 ps, the bandwidth of each channel is so large that significant spectral overlapping occurs between adjacent channels, which gives rise to system degradation. For pulse widths larger than 35 ps, a "walk-off" distance and the dispersion length increases, giving rise to a higher nonlinear penalty. For the hereinabove described exemplary system, a pulse width of around 25 ps is found to be an optimal value.

Figure 9:
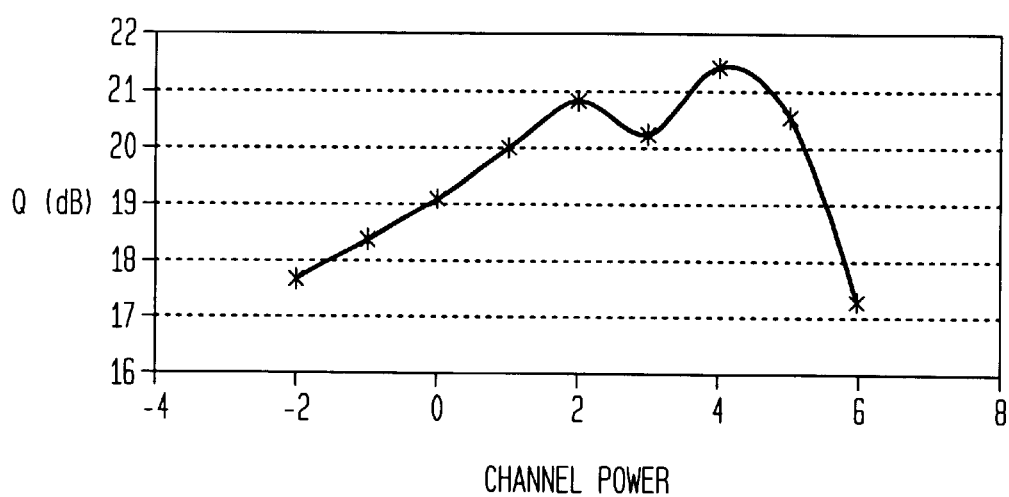
FIG. 9 graphically shows a plot of channel power for an optimization of channel power in an exemplary system in accordance with the present invention.

Referring now to FIG. 9, there is shown a plot of channel power in units of dBm (decibels/milliwatt) in FIG. 9 along the X-axis versus Q in dB along the Y-axis for the exemplary system. For determining optimization of channel power, the amplifier noise dominates for a channel power below 2 dBm, and nonlinearity dominates for a channel power greater than 5 dBm. Therefore, the optimal channel power for the above exemplary system is around 2–4 dBm.

Figure 10:
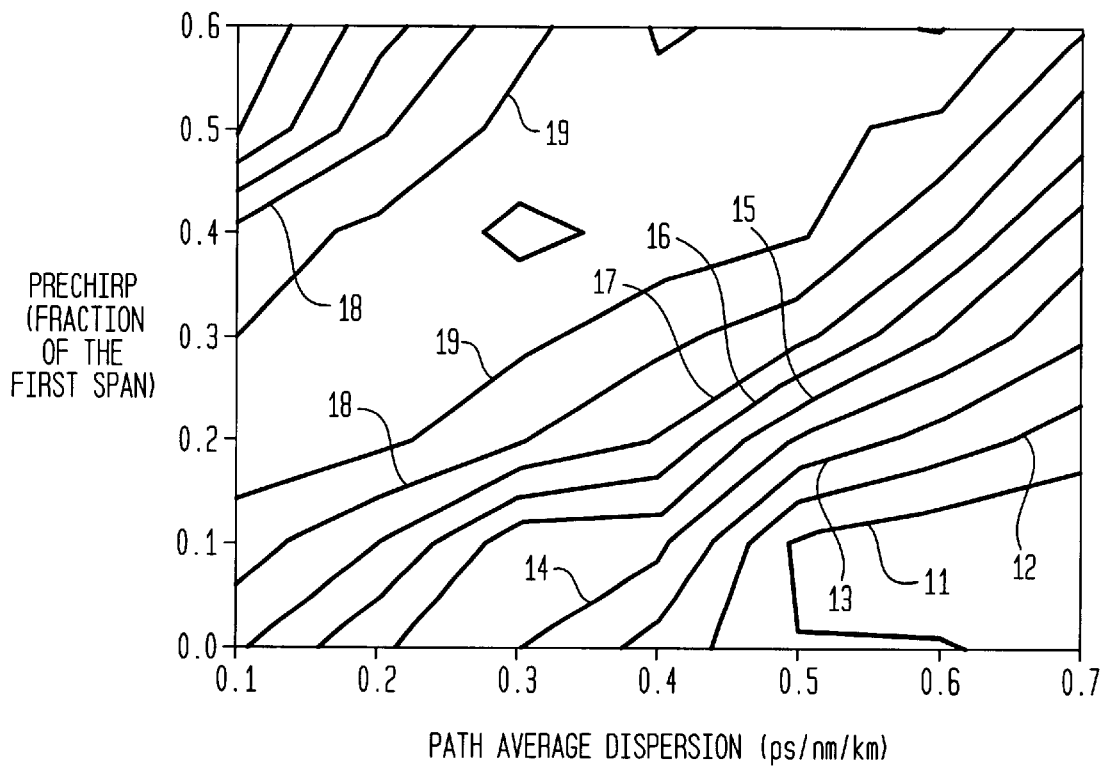
FIG. 10 graphically shows a contour plot for path average dispersion for one section of a optical transmission fiber in accordance with the present invention.

Referring now to FIG. 10, there is graphically shown a contour plot for path average dispersion in units of ps/nm/km along the X-axis versus pre-chip in a unit normalized value on the Y-axis for one section of the optical transmission fiber 12. Q contours are plotted in 1 dB intervals. The numbers 11–19 provided for the various contour lines in FIG. 10 in 1 dB increments and represent corresponding Q factor values which are monitor system performance. There is a 1:1 correspondence between the Q factor and the bit error rate (BER). Therefore, if the Q factor is 18 the BER is $10^{-15}$. There is a quasi-linear relationship between the pre-chirp and the average dispersion. The optimum combination of pre-chirp and average dispersion is when the pre-chirp=0.4, and the average dispersion=0.3 ps/nm/km. There is a large available margin around the optimum point so that the 1 dB range for pre-chirp is from 0.26–0.55, while for the average dispersion it is from 0.15–0.5. It is shown that the exemplary system has a significant tolerance to both pre-chirp and average dispersion. Since the optimization is done using multiple channels, the results are different from those of dispersion managed soliton (DMS) systems. The channel power is selected in such a way that the system behavior is quasi-linear. The impacts of self-phase modulation (SPM), cross-phase modulation (XPM), four-wave mixing (FWM), and Raman effects are minimized in the present invention in such a manner that the total system characteristics are similar to those of linear systems. There are fundamental difference between the present inventive system and prior art return-to-zero (RZ) systems such as dispersion-managed soliton (DMS) systems. For example, DMS predicts significant power enhancement, which is valid for single channel propagation. It further requires accurate balance between the SPM in a transmission fiber and SPM in a dispersion compensating fiber, which often results in a much smaller system margin. In accordance with the present invention, the power in the dispersion compensating elements of (a) the broadband dispersion compensator (BDC) 84 and 94 in the optical line amplifiers 32 and the transmitter terminal 14, and (b) the dispersion compensating modules (DCM) 98a–98x in the dispersion compensating line amplifier 36 are designed to be smaller than the nonlinear threshold. Therefore, the spectral broadening due to SPM is balanced by a proper design of the pre-chirp. This approach has an advantage over DMS systems in that it enlarges the system margin as is shown in FIG. 10. Another advantage is that it allows a system designer to deal with any types of transmission fibers using the same principles.

Figure 11:
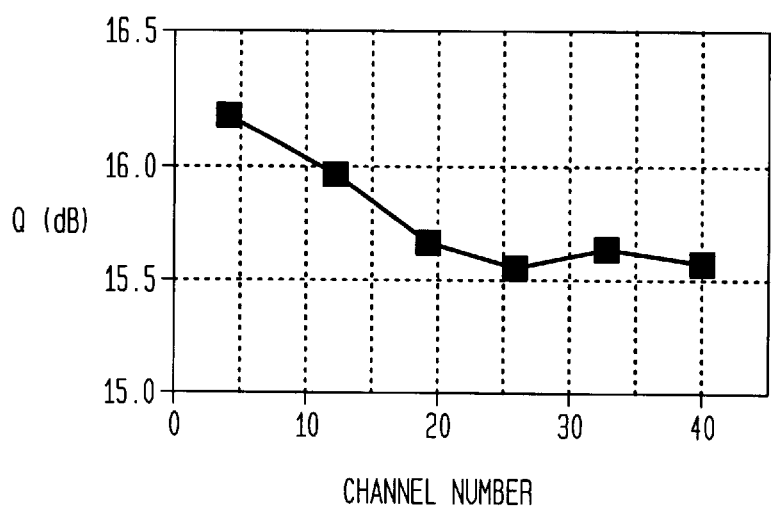
FIG. 11 graphically shows a plot of channel loading penalty using a frequency band approach in accordance with the present invention.

Referring now to FIG. 11, there is graphically shown a plot of channel loading penalty using a frequency band approach where the channel number (Channel #) is shown along the X-axis and Q in units of dB (decibels) are shown along the Y-axis for a cross-phase modulation (XPM) effect. The band structure has an advantage of minimizing the nonlinear channel-to-channel interaction which is always a big concern for network designers. Scalability provides significant economic and network flexibility advantages. From the plot of FIG. 11, the nonlinear degradation is limited to a few channels (e.g., channels 4–9) since they are outside an allowable channel loading penalty of 0.5 dB. The total channel loading penalty is controlled to within 0.5 db, and the absolute values of Q are lower in value than found, for example, in FIGS. 8 and 9 since the loss in a transmission line section is much higher (25 dB) and the distance is 3200 km.

Figure 12:
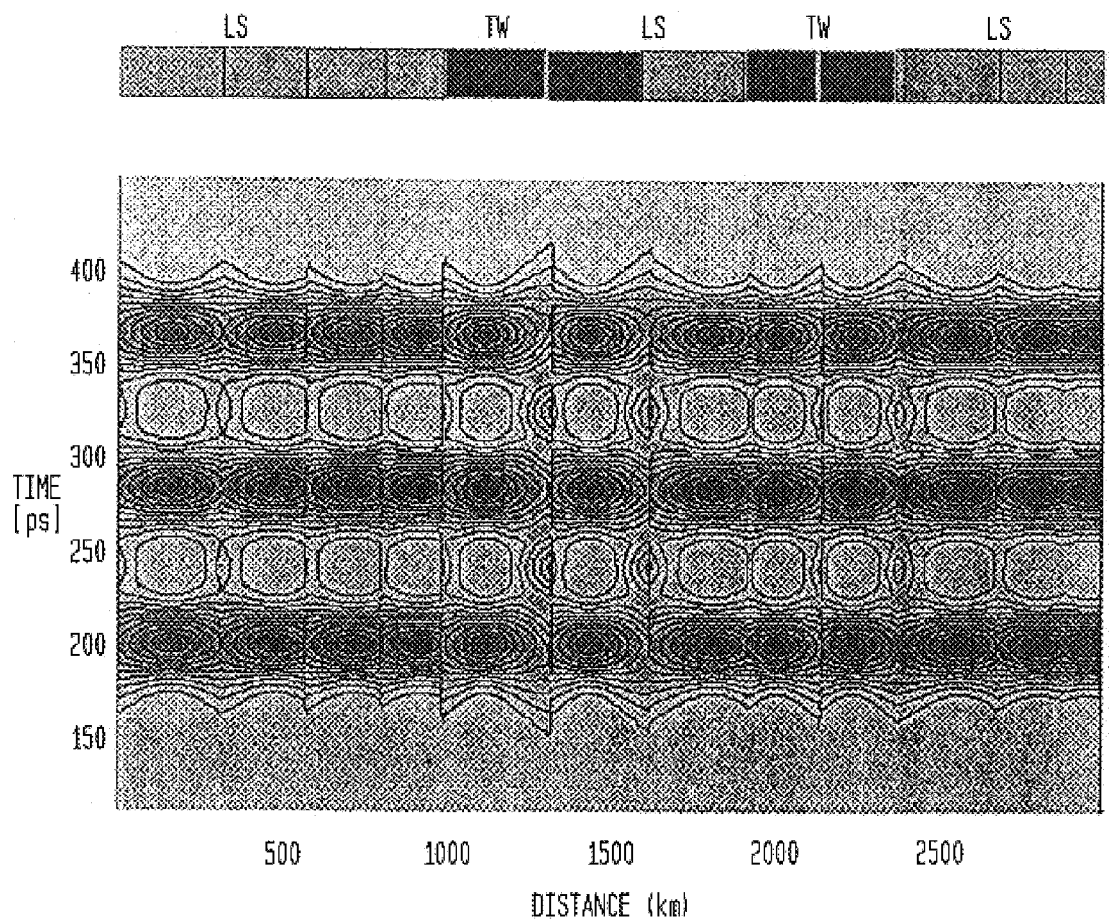
FIG. 12 shows a graph for dispersion management of an exemplary system for an exemplary transmission line route of 2950 km consisting of mixed optical fibers in accordance with the present invention.

Referring now to FIG. 12, there is shown a graph of propagation distance in kilometers (km) along the X-axis versus Time in picoseconds (ps) along the Y-axis for an exemplary transmission line route of 2950 km consisting of mixed optical fibers designated LS and TW. Both of the LS and TW type optical fibers are commercial non-zero dispersion-shifted fibers (NZDSF). For the exemplary system described hereinabove, there are three sections of the LS type fiber and two sections of the TW type fiber shown above the graph. The length of each box at the top of FIG. 12 indicated the locations of the sites of the DCLAs 36 along the optical transmission line 12. The pre-chirp and average dispersion is optimized according to the design rules of the present invention. The contour of the plot indicates the evolution of pulse intensity along the transmission line 12. Although the optical fiber characteristics change dramatically at the interfaces of the different fibers (LS and TW), the pulse dynamics shown by the contours in the graph manages to evolve smoothly.

Figure 13:
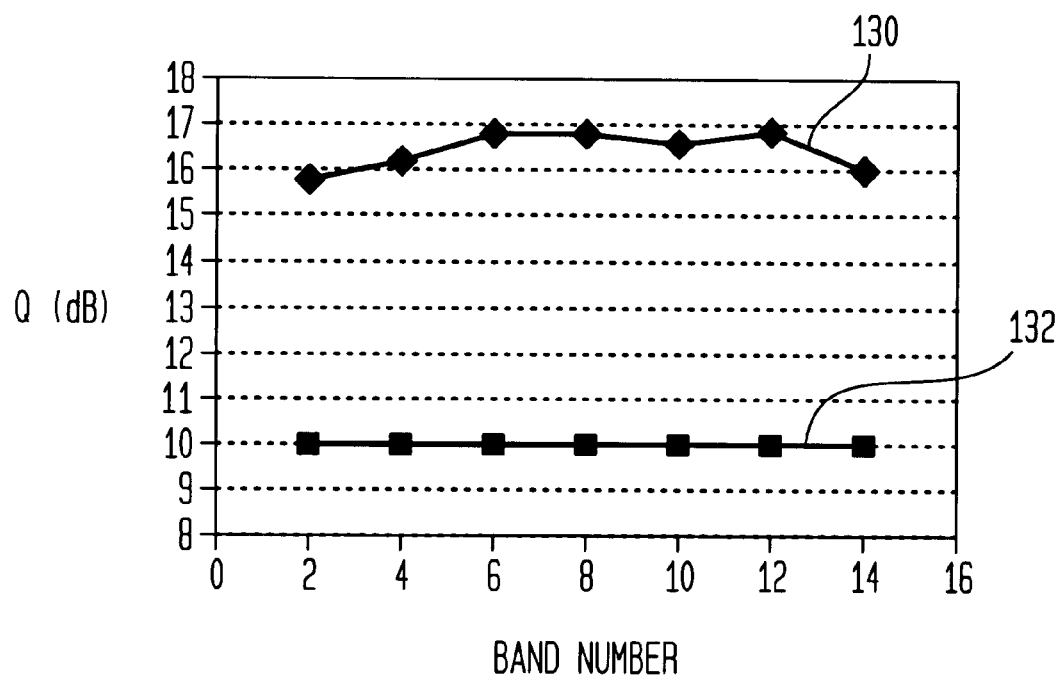
FIG. 13 graphically shows a plot for an exemplary system performance of predetermined hybrid fiber types after transmitting optical signals through a distance of 2950 km through the mixed fibers in accordance with the present invention.

Referring now to FIG. 13, there is graphically shown an exemplary system performance of the hybrid fiber types after transmitting signals through a distance of 2950 km in the mixed fibers of FIG. 12. The X-axis indicates the Frequency band number, and the Y-axis indicates Q in dB. Since a forward error correction (FEC) threshold is approximately 10 dB, there is a significant system margin at a distance of nearly 3000 km. The pre-chirp is approximately 0.5, the average dispersion is approximately 0.25 ps/nm/km, and the channel power is 0 dBm. The plot 130 represents values for TW plus LS type optical fibers while the plot 132 represents values for an FEC limit.

In summary, as a result of proper management of both optical nonlinearities such as self-phase modulation (SPM), cross-phase modulation (XPM), four-wave mixing (FWM), stimulated Raman scattering, and higher-order chromatic dispersion, a lightwave system can be designed with the following advantages. The system can provide ultra-long haul transmission over arbitrary single mode transmission fibers, or mixed fiber types, without the use of electronic regenerators. The system can provide flexible channel/band add/drop capability in the sense that an arbitrary number of channels can be dropped or added at arbitrary locations along an optical transmission line 12. The present invention provides a scalable network design that is enabled by a dispersion management technique. Since the chromatic dispersion is managed on a link-by-link basis, the transmission is not distance-dependent, which makes the network scalable. Finally, a scalable transmission capacity is enabled by a wavelength management technique. The three enabling technologies used to obtain the present invention are (a) a return-to-zero (RZ) modulation format, (b) a wavelength band structure for bandwidth management, dispersion management, and nonlinearity management, and (c) distributed Raman amplification. The wavelength bandwidth structure includes the transmission multiplexing technique, the structure of the dispersion compensating line amplifier (DCLA) 36 for higher-order dispersion management, and the demultiplexing in the receiver terminal 14.

It is to be appreciated and understood that the specific embodiments of the present invention described hereinbefore are merely illustrative of the general principles of the invention. Various modifications may be made by those skilled in the art which are consistent with the principles set forth.

What is claimed is:

1. An optical transmission system comprising:
   a plurality of return-to-zero (RZ) transmitters, each RZ transmitter comprising:
      a forward error correction (FEC) encoder for receiving a channel input signal and generating therefrom a corresponding FEC encoded output signal;
      a laser comprising a predetermined frequency which is driven by a predetermined clock signal for generating an optical output signal; and
      a modulator for modulating the optical output signal from the laser with the FEC encoded output signal from the FEC encoder for generating a channel output signal in a predetermined channel frequency sub-band of an overall frequency band which includes a predetermined channel separation from an adjacent channel frequency sub-band generated by another RZ transmitter; and
   a multiplexing arrangement for multiplexing the plurality of predetermined channel frequency sub-bands from the plurality of RZ transmitters into separate groups of frequency bands where the groups of frequency bands have a predetermined band-gap separation therebetween wherein each group of frequency bands has a predetermined separate pre-chirp introduced before being multiplexed with all other groups of frequency bands into a single multiplexed output signal.

2. The optical transmission system of claim 1 further comprising:
   an optical transmission line having an input coupled to an output of the multiplexing arrangement and being subdivided into a plurality of optical transmission line sections, said optical transmission line comprising:
      a plurality of Raman amplifiers, one of the plurality of Raman amplifiers being located at the end of each optical transmission line section and being adapted to receive at an input thereof the single multiplexed output signal propagating in an associated transmission line section, and to combine a predetermined Raman pump power signal into the optical transmission line section in an opposite direction to the received single multiplexed output signal to generate at an output thereof an output signal which is Raman amplified for increasing a path averaged optical power without increasing nonlinear degradation; and
      at least one dispersion compensating line amplifier (DCLA) coupled to an output of a Raman amplifier at the end of a predetermined group of optical transmission line sections, said DCLA being adapted to introduce dispersion compensation for the single multiplexed output signal, and to introduce separate high-order dispersion compensation for each of the groups of frequency bands therein.

3. The optical transmission system of claim 1 wherein the multiplexing arrangement comprises:
   a plurality of channel multiplexers, each channel multiplexer multiplexing a predetermined group of channel frequency sub-bands from a separate group of RZ transmitters into a separate single output frequency band with a predetermined bandgap from an adjacent single output frequency band from another channel multiplexer;
   a plurality of dispersion compensating arrangements, each dispersion compensating arrangement introducing a separate predetermined pre-chirp into the single output frequency band from a separate one of the plurality of channel multiplexers and generating a dispersion compensated frequency band output signal; and
   a band multiplexer for combining each of the dispersion compensated frequency band output signals into the single multiplexed output signal.

4. The optical transmission system of claim 2 wherein each of the plurality of Raman amplifiers comprises:
   a plurality of Z Raman pump lasers where Z is dependent on a type of optical fiber used for the associated optical transmission line section, each Raman pump laser generating an output signal at a separate predetermined wavelength;
   an optical combiner for combining the output signals from the plurality of Raman pump lasers into a single output signal; and
   a wavelength division multiplexer (WDM) for receiving the single multiplexed output signal propagating in a first direction along the associated transmission line section for coupling the output signal from the optical combiner into the optical transmission line in an opposite direction from said received single multiplexed output signal.

5. The optical transmission system of claim 2 wherein the dispersion compensating line amplifier (DCLA) comprises:

a band demultiplexer for demultiplexing the single multiplexed output signal from the multiplexing arrangement received from prior sections of the optical transmission line into the separate groups of frequency bands for transmission over separate output paths;

a plurality of dispersion compensating modules (DCM), each DCM located in a separate output path from the band demultiplexer for providing dispersion compensation for the associated group of frequency bands demultiplexed onto said output path and providing a band dispersion compensated output signal; and a band multiplexer for combining the band dispersion compensated output signals from the plurality of DCMs into a single multiplexed output signal from the DCLA.

6. The optical transmission system of claim 5 wherein the dispersion compensating line amplifier (DCLA) further comprises:

a gain equalizing filter (GEF) for equalizing gain variations in the single multiplexed output signal from the multiplexing arrangement occurring in prior sections of the optical transmission line and generating a gain equalized output signal; and a broadband dispersion compensator (BDC) for compensating for chromatic dispersion at wavelengths in the gain equalized output signal from the gain equalizing filter and providing a dispersion compensated output signal to the band demultiplexer.

7. The optical transmission system of claim 2 wherein the optical transmission line further comprises a plurality of optical line amplifiers (OLA), each OLA located at the start of selected ones of the plurality of optical transmission line sections and comprising:

a gain equalizing filter for equalizing gain variations in the single multiplexed output signal from the multiplexing arrangement occurring in a prior section of the optical transmission line and generating a gain equalized output signal; and an amplifier for generating an output signal from the OLA which amplifies the gain equalized output signal to a predetermined amplification level.

8. The optical transmission system of claim 7 wherein the OLA further comprises a broadband dispersion compensator when a non-dispersion shifted optical fiber with a high chromatic dispersion at a predetermined transmission wavelength is used in a prior section of the optical transmission line.

9. The optical transmission system of claim 2 further comprising a receiver terminal located at an end of the optical transmission line opposite the location of the multiplexing arrangement, the receiver terminal comprising:

a band demultiplexer responsive to a received single multiplexed output signal from the multiplexing arrangement for demultipexing the groups of frequency bands so that each group of frequency bands is provided as a separate output signal onto a separate output path thereof;

a plurality of post dispersion compensators (PDC), each PDC being located in a separate output path from the band demultiplexer for providing separate dispersion compensation to an associated group of frequency bands received from the band demultiplexer;

a plurality of channel band demultiplexers, each channel band demultiplexer receiving a separate group of frequency bands from the band demultiplexer and demultiplexing the channels in said separate group of frequency bands into individual channel output signals for propagation along a separate output path thereof; and a plurality of return-to-zero receivers (RZRX), each RZRX receiving a separate channel output signal from the plurality of channel band demultiplexers and decoding data in said channel output signal for generating an output signal from the receiver terminal.

10. The optical transmission system of claim 9 wherein each RZRX comprises:

an automatic gain control (AGC) arrangement responsive to an associated separate channel output signal received from the plurality of channel band demultiplexers for generating an output signal corresponding to the received associated separate channel output signal which is maintained at a predetermined level;

a clock/data recovery unit for recovering a clock signal and a data signal from the output signal from the AGC arrangement; and a forward error correction (FEC) decoder responsive to the clock signal and data signal recovered by the clock/data recovery unit for decoding the data and generating a decoded data output signal from the RZRX.

11. A method of transmitting signals in an optical transmission system comprising the steps of:

(a) receiving a plurality of channel input signals in a respective plurality of forward error correction (FEC) encoders for generating therefrom a respective plurality of FEC encoded output signals;

(b) generating a plurality of optical output signals from a respective plurality of lasers each comprising a predetermined frequency which is driven by a predetermined clock signal;

(c) modulating the plurality of optical output signals from the plurality of lasers with the plurality of FEC encoded output signals from the plurality of FEC encoders for generating a plurality of channel output signals in predetermined channel frequency sub-bands of overall frequency bands which include predetermined channel separations from adjacent channel frequency sub-bands; and (d) multiplexing the plurality of the predetermined channel frequency sub-bands into separate groups of frequency bands where the groups of frequency bands have a predetermined band-gap separation therebetween, wherein each group of frequency bands has a predetermined separate pre-chirp introduced before being multiplexed with all other groups of frequency bands into a single multiplexed output signal.

12. The method of claim 11 further comprising the steps of:

(e) receiving the single multiplexed output signal in an optical transmission line which is subdivided into predetermined optical transmission line sections;

(f) receiving the single multiplexed output signal propagating in each optical transmission line section by a separate Raman amplifier which combines a predetermined Raman pump power signal into the optical transmission line section in an opposite direction to the received single multiplexed output signal to generate an output signal which is Raman amplified for increasing a path averaged optical power without increasing non-linear degradation; and (g) introducing dispersion compensation from a dispersion compensating line amplifier (DCLA) into the single multiplexed output signal from an output of a Raman amplifier at the end of a predetermined group of optical transmission line sections for providing separate high-order dispersion compensation for each of the groups of frequency bands in said single multiplexed output signal.

13. The method of claim 11 wherein in performing step (d) performing the substeps of:
   (d1) multiplexing a separate predetermined group of channel frequency sub-bands in a separate one of a plurality of channel multiplexers for generating a separate single output frequency band with a predetermined bandgap from an adjacent single output frequency band from another channel multiplexer;
   (d2) introducing a separate predetermined pre-chirp into the single output frequency band from a separate one of the plurality of channel multiplexers in step (d1) in a separate one of a plurality of dispersion compensating arrangements and generating a dispersion compensated frequency band output signal; and
   (d3) combining each of the dispersion compensated frequency band output signals into the single multiplexed output signal in a band multiplexer.

14. The method of claim 12 wherein in performing step (f) performing the substeps of:
   (f1) generating an output signal at a separate predetermined wavelength in each of a plurality of Z Raman pump lasers, where Z is dependent on a type of optical fiber used for the associated optical transmission line section;
   (f2) combining the output signals from the plurality of Raman pump lasers into a single output signal in an optical combiner; and
   (f3) receiving the single multiplexed output signal propagating in a first direction along the associated transmission line section in a wavelength division multiplexer (WDM) for coupling the output signal from the optical combiner into the optical transmission line in an opposite direction from said received single multiplexed output signal.

15. The method of claim 12 wherein in performing step (g) performing the substeps of:
   (g1) demultiplexing the single multiplexed output signal received from prior sections of the optical transmission line into the separate groups of frequency bands for transmission over separate output paths in a band demultiplexer;
   (g2) providing dispersion compensation for an associated group of frequency bands demultiplexed onto an associated output path in step (g1) in a separate one of a plurality of dispersion compensating modules (DCM), and providing a band dispersion compensated output signal from said separate DCM; and
   (g3) combining the band dispersion compensated output signals from the plurality of DCMs into a single multiplexed output signal from the DCLA in a band multiplexer.

16. The method of claim 15 wherein in performing step (g2) performing the steps of:
   (h) equalizing gain variations in the single multiplexed output signal occurring in prior sections of the optical transmission line in a gain equalizing filter (GEF), and generating a gain equalized output signal; and
   (i) compensating for chromatic dispersion at wavelengths in the gain equalized output signal from the gain equalizing filter in a broadband dispersion compensator (BDC), and providing a dispersion compensated output signal to the band demultiplexer of step (g1).

17. The method of claim 12 wherein in performing step (e) the optical transmission line comprises a plurality of optical line amplifiers (OLA), each OLA located at the start of selected ones of the plurality of optical transmission line sections, performing the substeps of:
   (e1) equalizing gain variations in the single multiplexed output signal from the transmitter terminal occurring in a prior section of the optical transmission line in a gain equalizing filter and generating a gain equalized output signal; and
   (e2) generating an output signal from the gain equalized output signal in an amplifier for amplifying the gain equalized output signal to a predetermined amplification level.

18. The method of claim 12 wherein a receiver terminal is located at an end of the optical transmission line opposite the location where the single multiplexed output signal is introduced, the method comprising the further steps of:
   (h) demultipexing the groups of frequency bands received in the single multiplexed output signal in a band demultiplexer for directing each group of frequency bands as a separate output signal onto a separate output path thereof;
   (i) introducing separate dispersion compensation to an associated group of frequency bands received from the band demultiplexer in a separate one of a plurality of post dispersion compensators (PDC) located in a separate output path from the band demultiplexer;
   (j) demultiplexing channels in a separate group of frequency bands from the band demultiplexer into individual channel output signals in a separate one of a plurality of channel band demultiplexers for propagation along a separate output path thereof; and
   (k) receiving each separate channel output signal from the plurality of channel band demultiplexers in a separate one of a plurality of return-to-zero receivers (RZRX), and decoding data in said channel output signal for generating an output signal from the receiver terminal.

19. The method of claim 18 wherein in performing step (k) performing the substeps of:
   (k1) generating an output signal in an automatic gain control (AGC) arrangement of the RZRX corresponding to an associated separate channel output signal received from the plurality of channel band demultiplexers which is maintained at a predetermined level;
   (k2) recovering a clock signal and a data signal from the output signal from the AGC arrangement in a clock/data recovery unit; and
   (k3) decoding the data using the clock signal and data signal recovered by the clock/data recovery unit in step (k2) in a forward error correction (FEC) decoder for generating a decoded data output signal from the RZRX.

* * * * *